United States Patent
Oakley

Patent Number: 6,141,301
Date of Patent: *Oct. 31, 2000

[54] APPARATUS AND METHOD FOR DYNAMIC TRACKING AND FOCUS IN AN OPTICAL TAPE SYSTEM

[75] Inventor: William S. Oakley, San Jose, Calif.

[73] Assignee: Lots Technology, Inc., Santa Clara, Calif.

[ * ] Notice: This patent is subject to a terminal disclaimer.

[21] Appl. No.: 08/184,389

[22] Filed: Jan. 21, 1994

[51] Int. Cl.[7] ................................................. G11B 7/09
[52] U.S. Cl. ..................................... 369/44.23; 369/112
[58] Field of Search ............................... 369/44.23, 112, 369/44.24, 44.11, 44.14, 103, 109

[56] References Cited

U.S. PATENT DOCUMENTS

| | | | |
|---|---|---|---|
| 4,224,480 | 9/1980 | Satoh et al. | 369/103 |
| 4,793,696 | 12/1988 | Suh | 369/44.23 |
| 5,191,393 | 3/1993 | Higrette et al. | 356/384 |
| 5,202,875 | 4/1993 | Rosen et al. | 369/112 |
| 5,283,777 | 2/1994 | Tanno et al. | 369/108 |

*Primary Examiner*—Thang V. Tran
*Attorney, Agent, or Firm*—Blakely, Sokoloff, Taylor & Zafman

[57] ABSTRACT

In an optical storage system, an apparatus for focussing a light beam onto a recording medium. A light source generates a light beam which is modulated by a thin-film PLZT modulator array. A beamsplitter is used to direct the modulated light beam to an objective lens which focuses the modulated light beam onto the recording medium. The light reflected back from the recording medium is directed by the beamsplitter to a focus detector which generates an electrical signal corresponding to a degree of focus of the modulated light beam in reference to the recording medium. A focus actuator is placed in close proximity to the modulator, wherein the focus actuator has a mirrored surface for reflecting the light beam to the beamsplitter. By moving the focus actuator in an optical axis according to the electrical signal generated by the focus detector, a high bandwidth servo loop can be closed about the focal position.

17 Claims, 6 Drawing Sheets

APPARATUS AND METHOD FOR DYNAMIC TRACKING AND FOCUS IN AN OPTICAL TAPE SYSTEM

FIELD OF THE INVENTION

The present invention pertains to the field of optical tape systems. More particularly, the present invention relates to an apparatus and method for providing dynamic tracking and focus in optical tape systems.

BACKGROUND OF THE INVENTION

Since the advent of the information age, there has been a need for an efficient, fast, high capacity, and yet low cost system for the storage and retrieval of information. Ideally, such a system could be used by computers to store and retrieve digital data, document images, video images, sound recordings etc. In the past, magnetic recording devices such as floppy disk drives, hard disk drives, magnetic tape systems, etc., were used for the archival storage of information on computer systems and the like. However, magnetic recording technology is approaching physical limitations, whereas the demand for data storage and retrieval capability is increasing. This demand is expected to escalate in the future as multimedia, networking, and telecommunication applications become more sophisticated and prevalent.

One emerging technology being applied to the storage and retrieval field is that of optics. Rather than using conventional electrical signals, optical based systems utilize light beams (e.g., lasers) to convey and process information. Light beams offer advantages over electrical signals because of their high bandwidth and propagation speed. A well-known example of an optical storage system is an optical disk drive. In an optical disk drive, data is represented as a series of digital bits. A lens assembly is used to focus a light beam onto a rotating circular optical disk for reading and writing these bits to/from the disk.

Recently, flexible optical tape drives have entered the market. Optical tape drives allow for storage of digital information on a flexible optical tape with virtually limitless capacity and random access capability in a fast, efficient, and relatively cost effective manner. FIG. 1 shows a typical prior art optical tape drive system. The light generated from a light source 101, such as a laser diode, is collimated by collimator 102 to form a collimated light beam 111. The collimated light beam 111 then passes through a first relay lens 103 and focused onto modulator 104. Modulator 104 modulates the light beam. The modulated light beam is then sent through a second relay lens 105. A polarizing beamsplitter 106 is used to sample the modulated light beam. Only when the beam is modulated to a particular polarity is it passed on to the objective lens 108, which focuses the beam onto media 109. In this manner, the beam can be modulated to produce a digital bit stream representative of the information to be stored. In a read operation, the light beam, as modulated and reflected back by medium 109, is directed to a detector 110 by beam splitter 106. Detector 110 converts the received optical beam into electrical signals for processing.

In optical tape systems, the requirement to track the tape's surface while maintaining optical focus and simultaneously following a data track along the media, is normally achieved by means of a dual servo system. This dual servo system physically moves the objective lens in two axes. Very high data rate systems employing fast tape speeds imply great tape dynamics. Thus, there is a need in the prior art for a focus and track following mechanism having a high bandwidth.

SUMMARY OF THE INVENTION

The present invention pertains to an apparatus and method for providing dynamic tracking and focusing in an optical storage and retrieval system. A light source (e.g., a laser diode) produces a collimated light beam which is sent through a computer generated hologram. The computer generated hologram generates a beam array having multiple diffraction limited light beams. These beams pass through a beamsplitter to a modulator array and a focus actuator. The multiple beams of the beam array are modulated by the modulator, which is comprised of an electrode structure deposited onto a wafer or thin deposited layer of electro-optic ferroelectric ceramic (e.g., PLZT). The linearly polarized beams from are reflected back by the focus actuator, which is comprised of a piezoelectric material having a mirrored surface. These reflected, modulated beams are then routed by the beamsplitter to the recording media via a quarter wave plate. An objective lens is used to focus the beams onto the recording medium.

On readback, the beams reflected from the illuminated media is passed through the beamsplitter to the focus detector and the track and data detector. The focus detector detects whether the light beam is in focus relative to the recording media. An electrical signal is generated which indicates this degree of focus. The track and data detector is used to position the objective lens so as to properly track the data recorded on the recording medium. A tracking signal is generated for this purpose. Furthermore, the track and data detector generates an electrical digital signal corresponding to the reflected beams.

In the currently preferred embodiment, the modulator array is operated in a reflective mode in which the optical beams pass twice through the thin film PLZT ferroelectric modulator array. The mirrored surface of the actuator is placed in close proximity to the rear of the modulator array. This mirror is driven along the optical axis by means of the piezoelectric actuator. The optical path from the light source, to the piezoelectric focus actuator, to the recording medium, and finally to the focus detector and the track and data detector, is such that a slight positional change in the reflective surface of the mirror causes a focal change at the surface of the recording medium. This positional change is measured by the detectors, thereby enabling a high bandwidth servo loop to be closed about the focal position.

In one embodiment, the commonly used actuator associated with the objective lens is retained. This objective lens actuator is used to provide an offset along the optical axis for effecting a zero position adjustment. In the currently preferred embodiment, the offset adjustment is achieved by placing a focusing lens immediately in front of the modulator array. Positioning the focusing lens produces the desired offset. In an alternative embodiment, rotational adjustment of the computer generated hologram and the data detector array about their optical axes, changes the track spacing that can be read from the recording medium. This rotational adjustment can be implemented to control the track spacing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for dynamic tracking and focus in optical tape drives is described. In the following description, for purposes of explanation, numerous specific details are set forth, such as reflective configuration details, focus positions, focus control elements, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Although the following description references optical tape drive systems, the present invention can be applied to other types of optical storage and retrieval systems as well.

Figure 1:
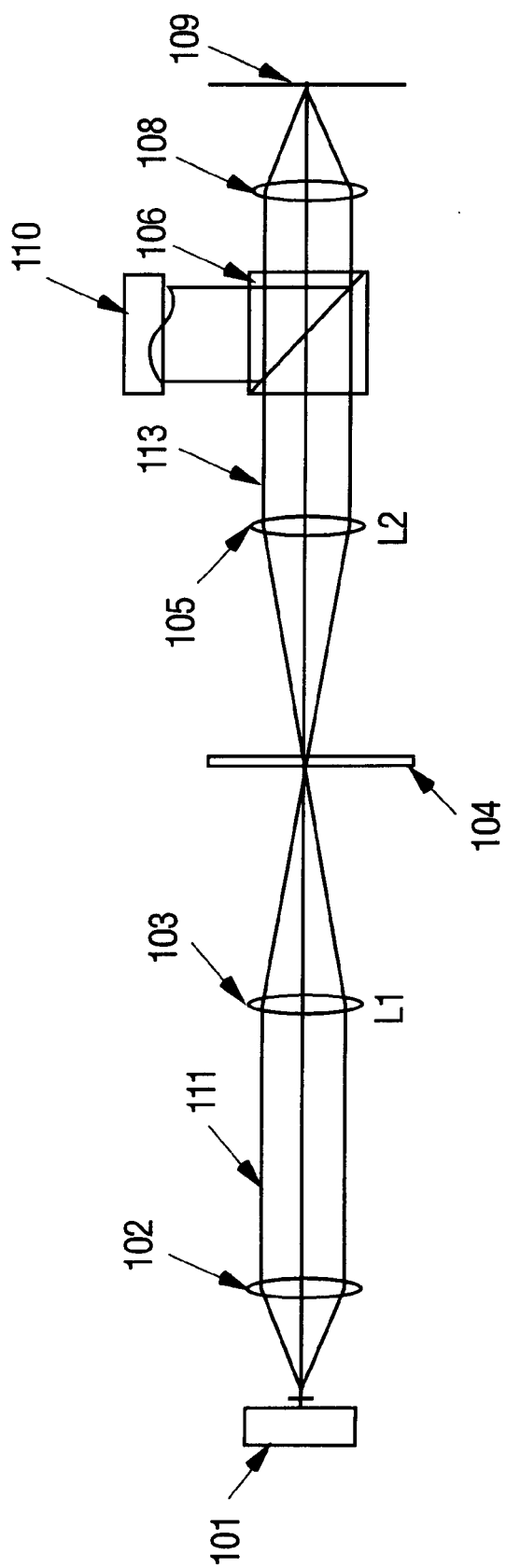
FIG. 1 shows a typical prior art optical tape drive system.
Figure 2:
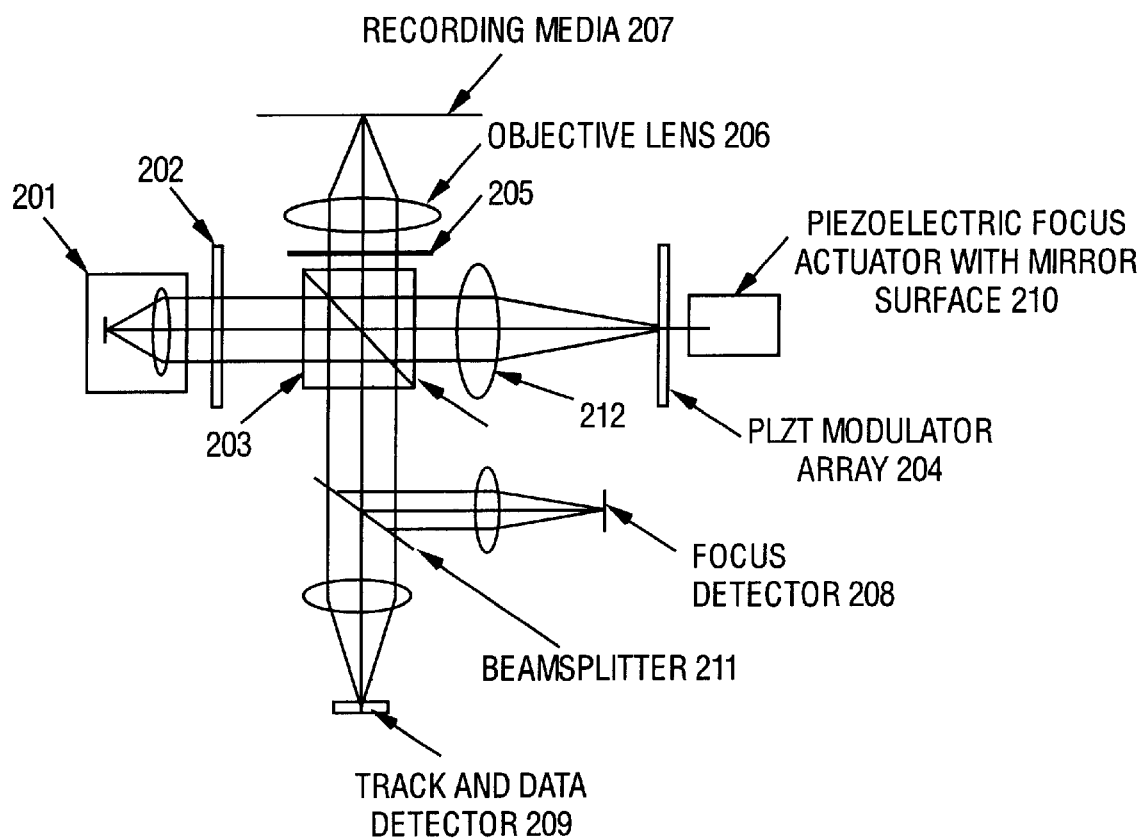
FIG. 2 shows an optical recording system having a ferroelectric modulator array upon which the currently preferred embodiment of the present invention may be practiced upon.

Referring to FIG. 2, an optical recording system having a ferroelectric modulator array upon which the currently preferred embodiment of the present invention may be practiced upon is shown. A light source 201 produces a collimated light beam which is sent through a computer generated hologram 202. In the currently preferred embodiment, the computer generated hologram 202 generates a beam array having multiple diffraction limited light beams. These beams pass through beamsplitter 203 to a modulator array 204 and focus actuator 210. The multiple beams of the beam array are modulated by modulator array 204. Modulator array 204 is comprised of an electrode structure deposited onto a wafer or thin deposited layer of electro-optic ferroelectric ceramic (e.g., PLZT). The linearly polarized beams from polarizing beamsplitter 203 are reflected back by the focus actuator 210. Focus actuator 210 is comprised of a piezoelectric material with a mirror surface. These reflected, modulated beams are then routed by beamsplitter 203 to the recording media 207 via quarter wave plate 205 and objective lens 206. On readback, the data reflected from the illuminated media surface 207 is passed through the beamsplitter 203 to the focus detector 208 and the track and data detector 209 via a second beamsplitter 211. The focus detector 208 detects whether the light beam is in focus relative to the recording media 207. An electrical signal is generated which indicates the degree of focus. Track and data detector 209 is used to position the objective lens 206 so as to properly track the data recorded on media 207. A tracking signal is generated for this purpose. Furthermore, detector 209 generates an electrical digital signal corresponding to the reflected beams.

In the currently preferred embodiment, modulator array 204 is operated in a reflective mode in which the optical beams pass twice through the thin film PLZT ferroelectric. A mirror is placed in close proximity to the rear of the modulator array 204.

This mirror is driven along the optical axis by means of the piezoelectric actuator 210. The optical path from the light source 201, to the piezoelectric focus actuator 210, to recording media 207, and finally to the focus detector 208 and the track and data detector 209, is such that a slight positional change in the reflective surface of the mirror causes a focal change at the surface of the recording media 20 7. This positional change is measured by the detectors 208–209, thereby enabling a high bandwidth servo loop to be closed about the focal position.

It should be noted that in one embodiment of the present invention, the commonly used actuator (not shown) associated with the objective lens 206 is retained. This objective lens actuator is used to provide an offset along the optical axis for effecting a zero position adjustment. In the currently preferred embodiment, the offset adjustment is achieved by placing a focusing lens 212 immediately in front of the modulator array 204. Positioning the focusing lens 212 produces the desired offset. Consequently, the requirement for dynamically moving the objective lens in the focus direction is eliminated. Furthermore, by implementing the focusing lens 212 in such a manner, the possibility of magnetic interference when focus actuators are used in conjunction with magnetically sensitive media (e.g., magneto-optic) or when magnetic effects are used in the tape support bearing structure is minimized. In one embodiment, rotational adjustment of hologram 202 and data detector array 204 about their optical axes, changes the track spacing that can be read from media 207. This rotational adjustment can be implemented to control the track spacing.

Figure 3A:
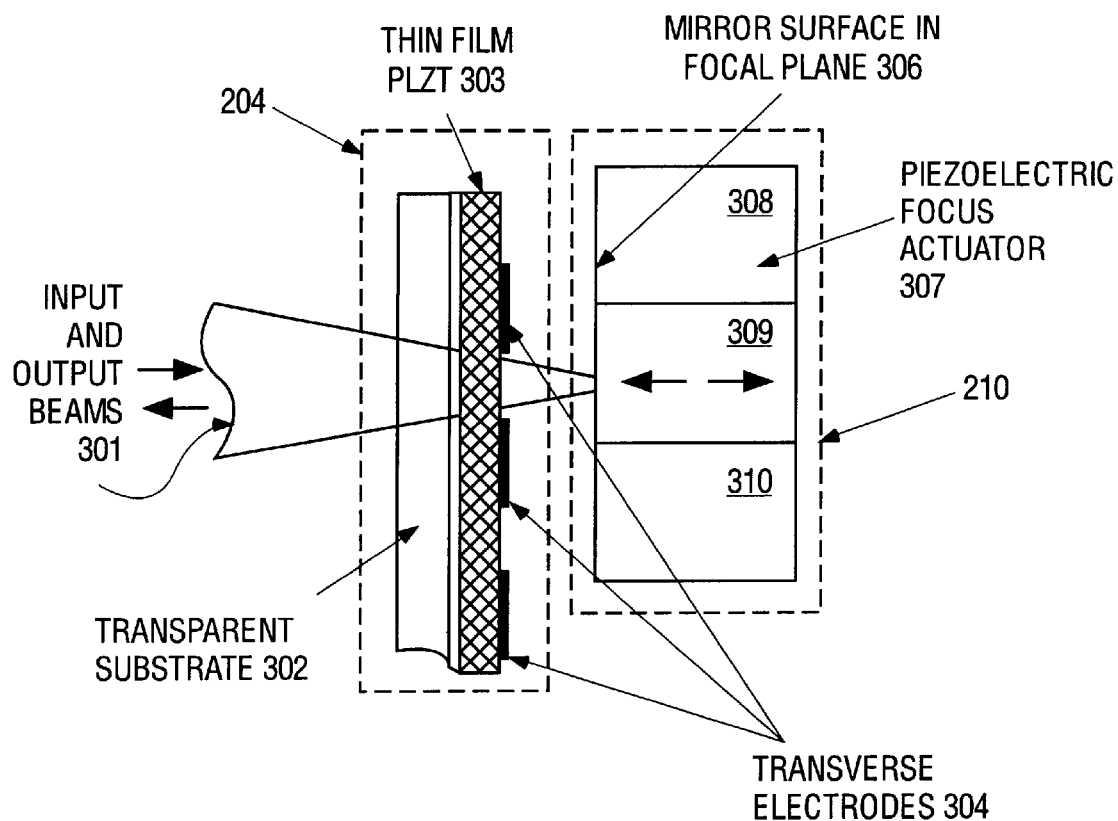
FIG. 3A shows a piezoelectric focus actuator and a reflective configuration of a modulator array having a transverse field imposed by surface electrodes.
Figure 3B:
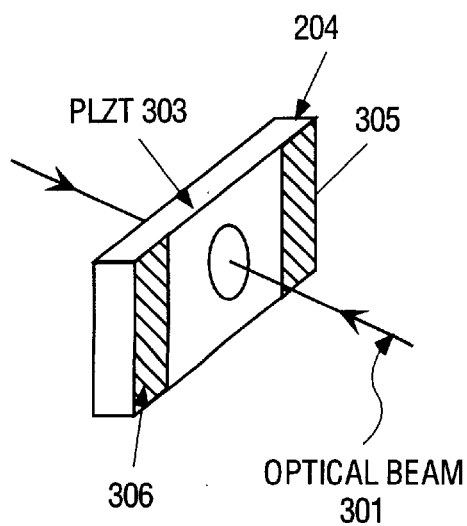
FIG. 3B shows a perspective view of a portion of the thin film PLZT modulator array with a transverse field.

FIG. 3A shows a piezoelectric focus actuator and a reflective configuration of a modulator array having a transverse field. The input beams 301 initially pass through the transparent substrate 302 of the modulator array 204. The input beams 301 continue through the thin film PLZT layer 303. But instead of passing through a transparent rear electrode, the beams pass between pairs of transverse electrodes 304. Electrodes 304 are used to transversely modulate the beams, depending upon whether a particular pair of electrodes have the same or different voltages applied. The input beams then strike the piezoelectric focus actuator 307. The focal plane surface 306 of actuator 307 is mirrored to reflect the beams outwards, back towards the modulator array 204. The reflected beams pass through and are output by modulator array 204. FIG. 3B shows a perspective view of a portion of the thin film PLZT modulator array with a transverse field as described above. An optical beam 301 passes between the two electrodes 305 and 306.

Figure 4:
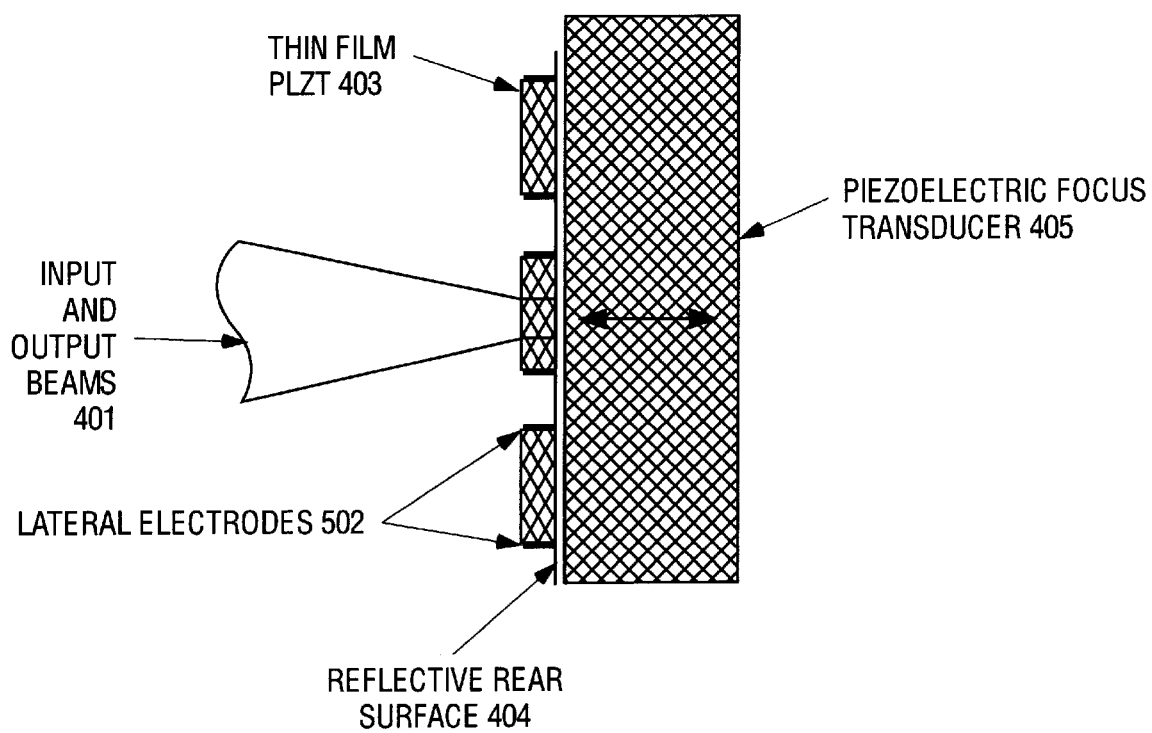
FIG. 4 shows the currently preferred embodiment of a piezoelectric focus actuator and a reflective configuration of a bulk modulator array having transverse fields.

FIG. 4 shows the currently preferred embodiment of a piezoelectric focus actuator and a reflective configuration of a modulator array having a lateral field. The beams 401 are modulated by the field from the lateral electrodes 402, which are placed on the thin film PLZT layer 403. A reflective rear electrode 404 is deposited on the piezoelectric focus transducer 405.

In the currently preferred embodiment, the piezoelectric material is used as the supporting structure for the thin film modulator, as shown in FIGS. 3A and 4. The PLZT elements are separated and individually addressed. In an alternative embodiment, static focus adjustment can be achieved by axial positioning of the focussing lens in front of the modulator. This may be manually or electromechanically positioned. If an electromechanical positioner is used, the magnetic field of the focus actuator is removed from the vicinity of the media and also away from the vicinity of the support bearing on which the tape rides.

Figure 5:
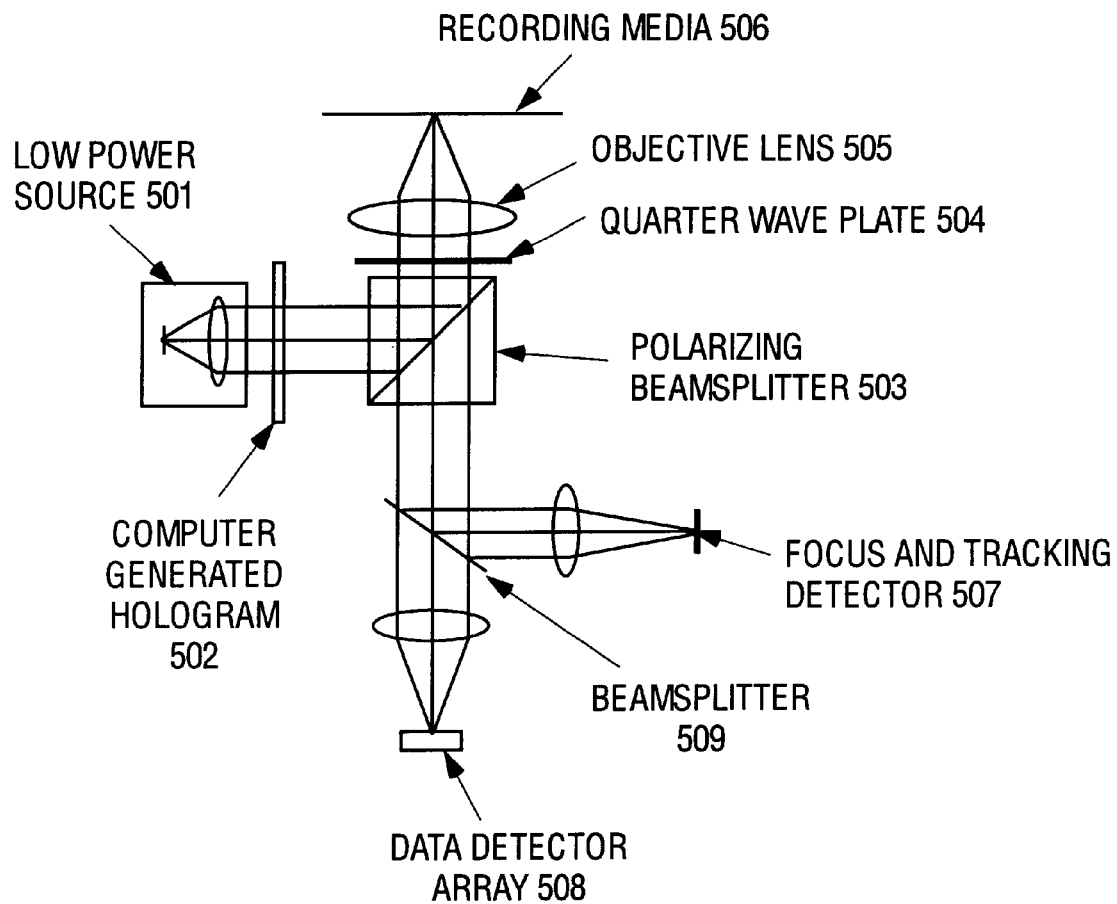
FIG. 5 shows one embodiment of a read only optical tape system configuration.

FIG. 5 shows one embodiment of a read only optical tape system configuration. In this configuration, the modulator assembly is removed. Power source 501 provides only sufficient laser power for reading data. The laser is operated in continuous wave (CW) mode. The two dimensional array of beams generated by the computer generated hologram 502 is directed through the quarter wave plate 504 and objective lens 505 onto the recorded media 506. The reflected beams from media 506 pass through the objective lens 505, quarter wave plate 504, beamsplitters 503 and 509 to data detector array 508. Data detector array 508 reads the beams in parallel. A separate detector 507 performs the focusing and tracking functions.

Figure 6:
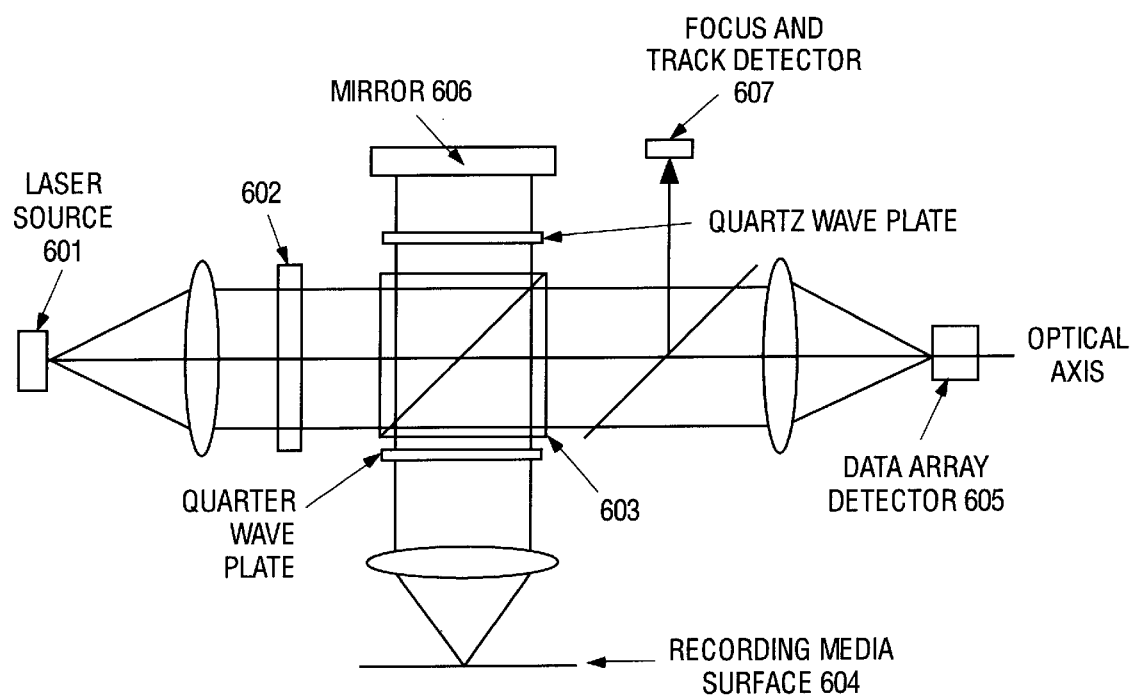
FIG. 6 shows one embodiment of a track spacing variation mechanism for a tape drive system.

FIG. 6 shows one embodiment of a track spacing variation mechanism for a tape drive system. The light from the laser source 601 passes to the mirror 606 via the polarizing beamsplitter 603 and then returns through the beamsplitter 603 to illuminate the media surface 604. From the media 604, the light passes again through the bearnsplitter 603 and goes to the array detector 605. Rotation of the computer generated hologram 602 and data detector array 605 as an assembly about the optical axis, varies the system track spacing. The focus and track detector 607 also rotates with the movable assembly.

Thus, an apparatus and method for dynamic tracking and focus in an optical tape drive system is disclosed.

What is claimed is:

1. In an optical storage system, an apparatus for focussing a light beam onto a recording medium, said apparatus comprising:
    a modulator for modulating said light beam to produce a modulated light beam;
    an objective lens for focussing said modulated light beam onto said recording medium;
    a focus detector for generating an electrical signal corresponding to a degree of focus of said modulated light beam in reference to said recording medium;
    a beamsplitter for directing said modulated light beam to said objective lens and directing a reflected light beam from said recording medium to said focus detector;
    a focus actuator placed in close proximity to said modulator, said actuator having a mirrored surface for reflecting said modulated light beam to said beamsplitter, wherein said focus actuator is moved in an optical axis responsive to said electrical signal generated by said focus detector.

2. The apparatus of claim 1, wherein said focus actuator is comprised of a piezoelectric element.

3. The apparatus of claim 1, wherein said focus actuator is comprised of a plurality of piezoelectric elements, wherein each of said elements are independently controlled and moved to focus a plurality of beams.

4. The apparatus of claim 1, wherein said focus actuator is comprised of a plurality of piezoelectric elements, wherein a group of said elements is independently controlled and moved.

5. The apparatus of claim 2, wherein said modulator is comprised of a thin ferroelectric modulator array for modulating a plurality of light beams.

6. The apparatus of claim 1 further comprising a focussing lens that is placed in front of said modulator, wherein an offset along said optical axis is achieved by said actuator without movement of said objective lens.

7. The apparatus of claim 6, wherein said actuator is positioned away from the vicinity of said recording media to minimize interference with said media.

8. The apparatus of claim 1 further comprising a hologram for generating a two-dimensional array of light beams.

9. The apparatus of claim 8 further comprising a means for rotating said hologram and said data detector about an optical axis to adjust track spacings of said recording medium.

10. In an optical storage system, a method for focussing a light beam onto a recording medium, said method comprising the steps of:
    modulating said light beam to produce a modulated light beam by using a modulator;
    focussing said modulated light beam onto said recording medium by using an objective lens;
    generating an electrical signal corresponding to a degree of focus of said modulated light beam in reference to said recording medium by using a focus detector;
    directing said modulated light beam to said objective lens;
    directing a reflected light beam from said recording medium to said focus detector;
    moving a focus actuator placed in close proximity to said modulator, said actuator having a mirrored surface for reflecting said modulated light beam to a beamsplitter which directs said modulated light beam to said objective lens, wherein said focus actuator is moved in an optical axis responsive to said electrical signal generated by said focus detector.

11. The method of claim 10 further comprising the step of implementing a piezoelectric element for said actuator.

12. The method of claim 11 future comprising the step of independently moving and controlling a plurality of elements of said actuator to focus a plurality of beams onto said recording medium.

13. The method of claim 12 future comprising the step of implementing a thin film ferroelectric modulator array for modulating said plurality of light beams.

14. The method of claim 10 further comprising the step of placing a focussing lens in front of said modulator, wherein an offset along said optical axis is achieved by said actuator without moving said objective lens.

15. The method of claim 14, wherein said actuator is positioned away from the vicinity of said recording media to minimize interference with said media.

16. The method of claim 10 further comprising the step of generating a two-dimensional array of light beams by implementing a computer generated hologram.

17. The method of claim 16 further comprising the step of rotating said computer generated hologram and said data detector about an optical axis to adjust track spacings of said recording medium.

* * * * *